United States Patent
Yim

(10) Patent No.: US 11,951,414 B2
(45) Date of Patent: *Apr. 9, 2024

(54) MODULAR ROBOT SYSTEM HAVING IMPROVED ASSEMBLY CONVENIENCE

(71) Applicant: ROBO RISEN CO., LTD., Seoul (KR)

(72) Inventor: Sang Bin Yim, Seoul (KR)

(73) Assignee: ROBO RISEN CO., LTD., Seoul (KR)

(*) Notice: Subject to any disclaimer, the term of this patent is extended or adjusted under 35 U.S.C. 154(b) by 489 days.

This patent is subject to a terminal disclaimer.

(21) Appl. No.: 17/276,022

(22) PCT Filed: Jul. 17, 2020

(86) PCT No.: PCT/KR2020/009461
§ 371 (c)(1),
(2) Date: Mar. 12, 2021

(87) PCT Pub. No.: WO2021/010793
PCT Pub. Date: Jan. 21, 2021

(65) Prior Publication Data
US 2022/0047961 A1 Feb. 17, 2022

(30) Foreign Application Priority Data
Jul. 17, 2019 (KR) .................. 10-2019-0086158

(51) Int. Cl.
*A63H 33/08* (2006.01)
*A63H 17/26* (2006.01)
(Continued)

(52) U.S. Cl.
CPC ......... *A63H 33/084* (2013.01); *A63H 17/262* (2013.01); *A63H 17/28* (2013.01);
(Continued)

(58) Field of Classification Search
CPC ...... A63H 17/262; A63H 29/22; A63H 30/02; G05B 2219/40304
See application file for complete search history.

(56) References Cited

U.S. PATENT DOCUMENTS 6,725,128 B2 * 4/2004 Hogg .................... G06N 3/008
702/182
7,541,768 B2  6/2009 Kim et al.
(Continued)

FOREIGN PATENT DOCUMENTS

JP        3141768        8/1997
JP     2017135961        8/2017
(Continued)

OTHER PUBLICATIONS

Cunning Turtle, "Radio Controlled Stepper in action," available at https://www.youtube.com/watch?v=BBwjsPy687E, published Jan. 24, 2012. (Year: 2012).*

(Continued)

*Primary Examiner* — Jay Trent Liddle
(74) *Attorney, Agent, or Firm* — H.C. Park & Associates, PLC

(57) ABSTRACT

A modular robot system includes N (N is an integer that is 2 or greater) cube-type unit robots, each of the N cube-type unit robots comprising: a housing in the shape of a regular hexahedron; a step motor installed in the housing; and a controller installed in the housing and for controlling the step motor. The housing has, on one surface thereof, a mounting groove in which a rotary body rotating by means of a rotating shaft of the step motor can be mounted, and, on the other surface of the housing, a connection groove in the same shape, so that by means of a connector to be mounted in the connection groove, connection to another cube-type unit robot is possible, and the housing has identification (Continued)

marks with different shapes from one another on the respective surfaces thereof.

14 Claims, 17 Drawing Sheets

(51) Int. Cl.
    *A63H 17/28*     (2006.01)
    *A63H 17/32*     (2006.01)
    *A63H 29/22*     (2006.01)
    *A63H 30/02*     (2006.01)
    *A63H 30/04*     (2006.01)
    *A63H 33/04*     (2006.01)

(52) U.S. Cl.
    CPC ............. *A63H 17/32* (2013.01); *A63H 29/22* (2013.01); *A63H 30/02* (2013.01); *A63H 30/04* (2013.01); *A63H 33/042* (2013.01); *A63H 2200/00* (2013.01)

(56) References Cited

U.S. PATENT DOCUMENTS

| | | |
|---|---|---|
| 10,507,586 B2 | 2/2019 | Tokuda |
| 2003/0038607 A1* | 2/2003 | Yim .......................... B25J 9/08 |
| | | 318/568.11 |
| 2016/0005331 A1* | 1/2016 | Ryland ...................... F16H 1/12 |
| | | 434/118 |
| 2016/0184993 A1* | 6/2016 | Brandwijk ............... B25J 9/101 |
| | | 463/31 |
| 2017/0008580 A1* | 1/2017 | Meager .................... B60K 1/04 |
| 2018/0193998 A1* | 7/2018 | Shin ....................... B25J 19/005 |
| 2018/0353871 A1* | 12/2018 | Oschuetz .................. B25J 9/08 |
| 2021/0162585 A1* | 6/2021 | Yang ...................... B25J 13/088 |

FOREIGN PATENT DOCUMENTS

| | | |
|---|---|---|
| KR | 10-0734281 | 7/2007 |
| KR | 10-1745629 | 6/2017 |
| KR | 10-2017-0085667 | 7/2017 |
| KR | 10-1746447 | 11/2017 |

OTHER PUBLICATIONS

International Search Report dated Oct. 30, 2020, in International Application No. PCT/KR2020/009461 (with English Translation).

* cited by examiner

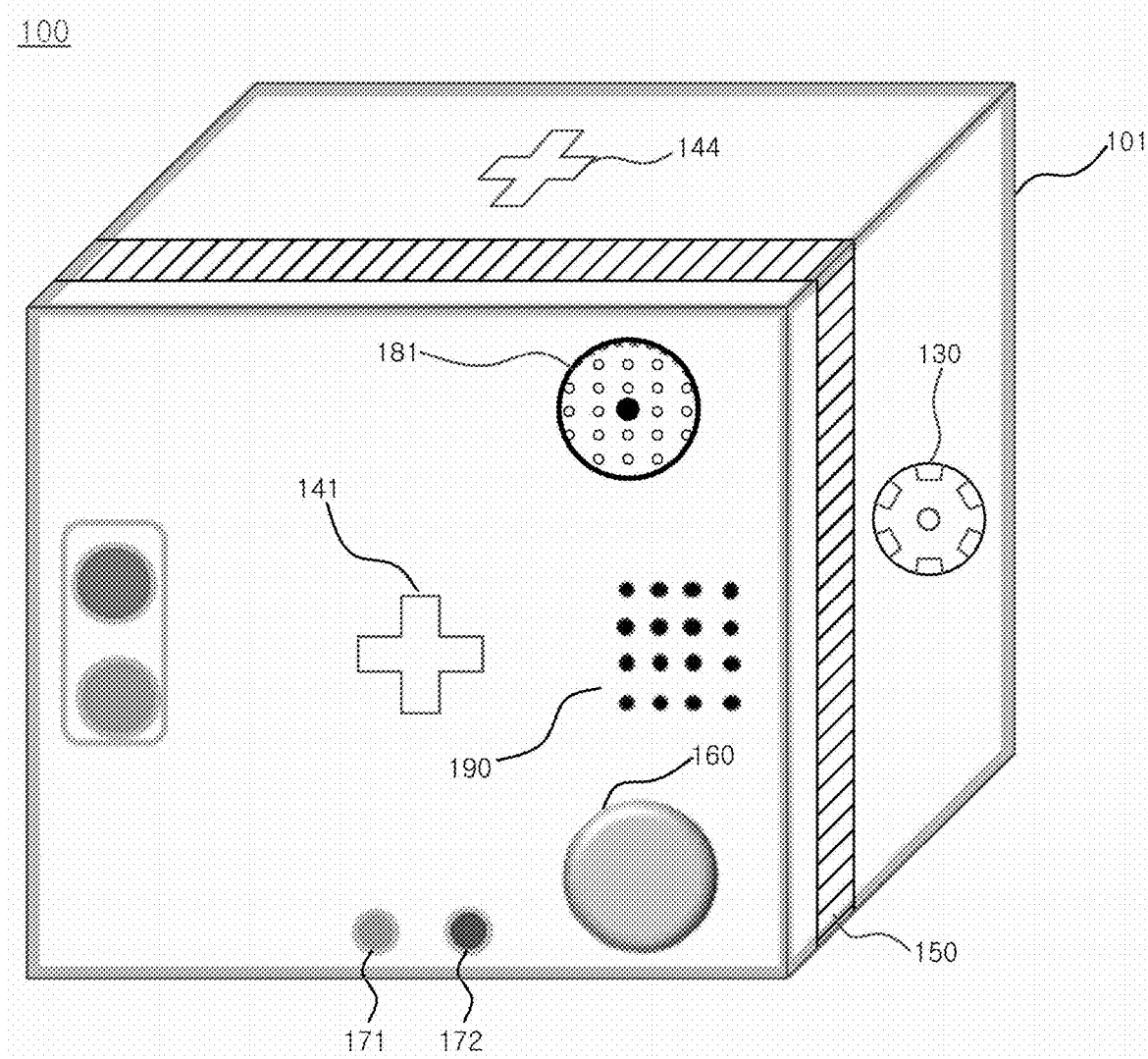

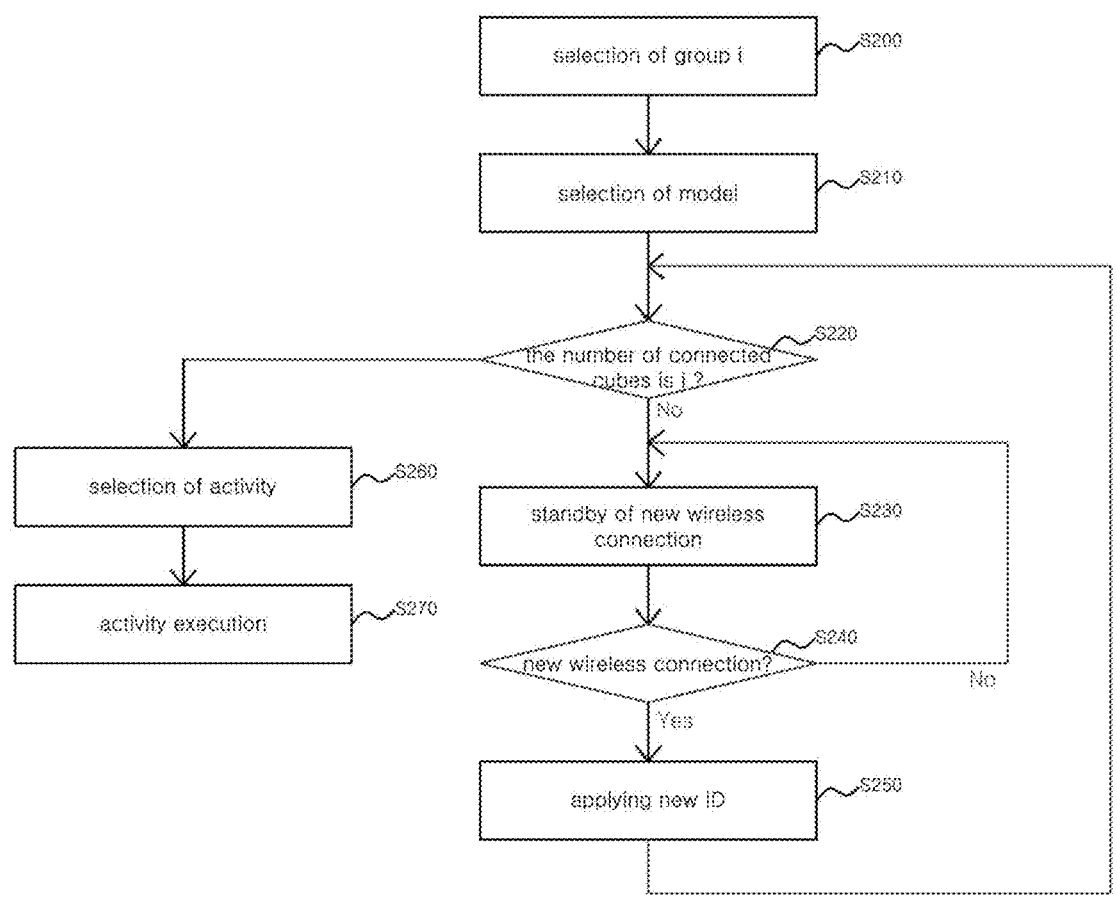

| Cube No | 1 | 2 | 3 | 4 |
|---|---|---|---|---|
| Control sequence | 30 | 60 | -30 | 60 |
| | 30 | -30 | -30 | 90 |
| | 30 | 90 | -30 | 120 |
| | 30 | 60 | -30 | 60 |
| | 30 | -30 | -30 | 90 |
| | 30 | 90 | -30 | 120 |
| | ⋮ | ⋮ | ⋮ | ⋮ |

1000-1  1000-2  1000-3  1000-4

MODULAR ROBOT SYSTEM HAVING IMPROVED ASSEMBLY CONVENIENCE

CROSS REFERENCE TO RELATED APPLICATIONS

This application is a National Stage Entry of International Application No. PCT/KR2020/009461, filed on Jul. 17, 2020, and claims priority from and the benefit of Korean Patent Application No. 10-2019-0086158, filed on Jul. 17, 2019, each of which is hereby incorporated by reference for all purposes as if fully set forth herein.

BACKGROUND

Field

The present invention relates to a modular robot system that is capable of being configured to allow a plurality of cube-type unit robots to be coupled to one another, and more particularly, to a cube-type unit robot that is capable of being improved in assembly conveniences.

Discussion of the Background

Recently, many kinds of robot toys, which are popular to children and teenagers, have appeared on the market. The robot toys are toys that are configured to automatically take given motions with power supplied thereto. They are generally provided as finished products, and most of them take formal, simple motions, so that children and teenagers are likely to lose interest in playing with them.

On the other hand, robot toys, which can be coupled to one another to provide various outer shapes and motions, have hit the market, but so as to allow the robot toys to take various outer shapes and motions, in this case, blocks with only specific functions have to be necessarily needed, so that if a user wants to couple robot toys with one another, all blocks needed for the robot toys should be prepared. Besides, other blocks have to be additionally purchased if he or she wants to couple robot toys with different functions or motions with one another. Accordingly, disadvantageously, a purchase cost becomes substantially raised.

SUMMARY

Accordingly, the present invention has been made to solve the above-mentioned problems, and it is an object of the present invention to provide a modular robot system that is capable of coupling modularized unit blocks with a simple shape to one another to provide various shapes and functions and complicated motions.

To accomplish the above-mentioned objects, according to one aspect of the present invention, there is provided a modular robot system having N (N is an integer greater than or equal to 2) cube-type unit robots, each of the N cube-type unit robots including: a housing in the shape of a regular hexahedron; a step motor installed in the housing; and a controller installed in the housing and for controlling the step motor, wherein the housing has, on one surface thereof, a mounting groove in which a rotary body rotating by means of a rotating shaft of the step motor can be mounted, and, on the other surface of the housing, a connection groove in the same shape, so that by means of a connector to be mounted in the connection groove, connection to another cube-type unit robot is possible, and the housing has identification marks with different shapes from one another on the respective surfaces thereof.

To accomplish the above-mentioned objects, according to another aspect of the present invention, there is provided a modular robot system having N (N is an integer greater than or equal to 2) cube-type unit robots, each of the N cube-type unit robots including: a housing in the shape of a regular hexahedron; a step motor installed in the housing; and a controller installed in the housing to control the step motor, wherein the housing has, on one surface thereof, a mounting groove in which a rotary body rotating by means of a rotating shaft of the step motor is mounted, and, on the other surface thereof, a connection groove in the same shape as the mounting groove, so that by means of a connector to be mounted in the connection groove, connection to another cube-type unit robot is possible, and the housing has identification marks with different shapes from one another on all surfaces except any one surface of the six surfaces thereof.

According to the present invention, the controller receives any one of different identification numbers designated to the N cube-type unit robots and performs a step motor control sequence corresponding to the identification number received among N step motor control sequences (which correspond to N identification numbers transmitted to the N cube-type unit robots) in advance defined.

According to the present invention, each cube-type unit robot further includes a light emitting body for emitting light through a light emitting area formed on the housing, and the controller controls the light emitting body to allow the light with a color corresponding to the identification number transmitted thereto to be emitted through the light emitting area.

According to the present invention, each cube-type unit robot further includes a display module for displaying information through a display area formed on the housing, and the controller controls the display module to allow the information corresponding to the identification number transmitted thereto to be outputted through the display area.

According to the present invention, each cube-type unit robot further includes a speaker disposed on the housing, and the controller controls the speaker to allow the sound corresponding to the identification number transmitted thereto to be outputted through the speaker.

According to the present invention, the modular robot system further includes a central control terminal for applying the different identification numbers to the N cube-type unit robots, the controller performing a step motor control sequence corresponding to the identification number received among N step motor control sequences (which correspond to N identification numbers transmitted to the N cube-type unit robots) in advance defined.

According to the present invention, the controller stores a lookup table with descriptors of the N step motor control sequences in advance defined, extracts the descriptors of the step motor control sequence corresponding to the identification number received from the lookup table stored, and performs the step motor control sequence on the basis of the descriptors of the step motor control sequence extracted.

According to the present invention, the descriptors of the N step motor control sequences are lists indicating the number of pulses per unit time.

According to the present invention, the central control terminal transmits the descriptors of the step motor control sequences corresponding to the identification numbers of the N cube-type unit robots to the N cube-type unit robots, and the controller performs the step motor control sequence on the basis of the descriptors of the step motor control sequence transmitted to the cube-type unit robot.

According to the present invention, the central control terminal transmits synchronization information to the N cube-type unit robots, the synchronization information having synchronization information transmission time point measured with respect to a timer operating therein, and transmits control sequence start commands to the N cube-type unit robots, the control sequence start commands having start time point information calculated with respect to the timer operating therein, and the controller starts an own timer thereof if the synchronization information is transmitted to the cube-type unit robot and if the control sequence start command is transmitted to the cube-type unit robot, performs the step motor control sequence at the start time point through the synchronization information transmission time point of the synchronization information and the own timer thereof.

According to the present invention, any one of the N cube-type unit robots serves as a central control terminal, and the cube-type unit robot serving as the central control terminal applies different identification numbers to the N cube-type unit robots, the controller performing a step motor control sequence corresponding to the identification number of the cube-type unit robot among N step motor control sequences (which correspond to N identification numbers transmitted to the N cube-type unit robots) in advance defined.

According to the present invention, the N cube-type unit robots further include reader devices for recognizing information stored in a given recording medium, and if the recording medium is recognized by means of any one of the reader devices of the N cube-type unit robots, the cube-type unit robot with the corresponding reader device serves as the central control terminal.

To accomplish the above-mentioned objects, according to yet another aspect of the present invention, there is provided a cube-type unit robot including: a housing in the shape of a regular hexahedron; a step motor located in the housing; and a controller located in the housing to control the step motor, wherein the housing has, on one surface thereof, a mounting groove in which a rotary body rotating by means of a rotating shaft of the step motor is mounted, and, on the other surface thereof, a connection groove in the same shape as the mounting groove, so that by means of a connector to be mounted in the connection groove, connection to another cube-type unit robot is possible, and the housing has identification marks with different shapes from one another on the respective surfaces thereof.

To accomplish the above-mentioned objects, according to still another aspect of the present invention, there is provided a cube-type unit robot including: a housing in the shape of a regular hexahedron; a step motor located in the housing; and a controller located in the housing to control the step motor, wherein the housing has, on one surface thereof, a mounting groove in which a rotary body rotating by means of a rotating shaft of the step motor is mounted, and, on the other surface thereof, a connection groove in the same shape as the mounting groove, so that by means of a connector to be mounted in the connection groove, connection to another cube-type unit robot is possible, and the housing has identification marks with different shapes from one another on all surfaces except any one surface of the six surfaces thereof.

According to the present invention, the modular robot system can couple the modularized unit blocks having a simple shape to one another to provide various, complicated motions.

In addition, the modular robot system according to the present invention can have different cube-type unit robot coupling ways or accessories, thereby providing robots having various shapes. According to the present invention, in particular, the cubes having the simple shape are coupled to one another through various ways, thereby providing the finished modular robots having various shapes.

Further, the modular robot system according to the present invention can provide various motions through the adjustment of only the step motor control sequences performed by the cube-type unit robots.

Also, the modular robot system according to the present invention can be applied to a toy. The modular robot toy can provide various motions according to coupling ways, so that a player who plays with the modular robot toy can have big fun and develop his or her creativity.

Moreover, since the cube-type unit robots have the shape of a regular hexahedron, they may be coupled to one another to wrong shapes. According to the present invention, however, the respective surfaces of the unit robot having the shape of the regular hexahedron can be easily distinguished from one another by the user, thereby providing many conveniences in coupling the respective unit robots to right shapes.

BRIEF DESCRIPTION OF THE DRAWINGS

The following drawings herein illustrate various embodiments of the present invention and serve to facilitate the general understanding of the scope of the present invention.

FIG. 3 is a perspective view showing an outer shape of the cube-type unit robot constituting the modular robot system according to the present invention.

FIG. 6B is a flowchart showing the process where the plurality of cube-type unit robots are connected to the central control terminal, which is performed from the point of view of the central control terminal.

FIG. 8 is a view showing an example of a lookup table including descriptors of step motor control sequences.

DETAILED DESCRIPTION

Figure 1:
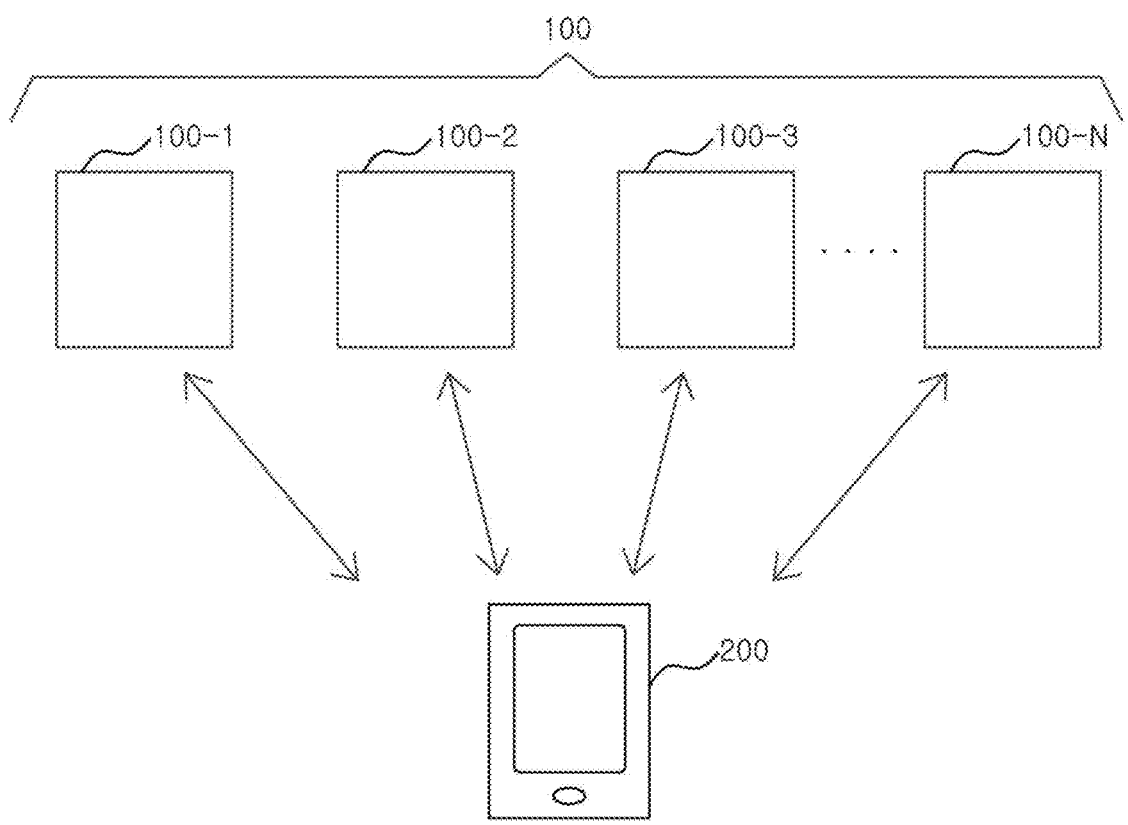
FIG. 1 is a schematic view showing a configuration of a modular robot system according to the present invention.

The present invention may be modified in various ways and may have several exemplary embodiments. Specific exemplary embodiments of the present invention are illustrated in the drawings and described in detail in the detailed description. However, this does not limit the invention within specific embodiments and it should be understood that the invention covers all the modifications, equivalents, and replacements within the idea and technical scope of the invention. If it is determined that the detailed explanation on the well known technology related to the present invention makes the scope of the present invention not clear, the explanation will be avoided for the brevity of the description.

Terms, such as the first, and the second, may be used to describe various elements, but the elements should not be restricted by the terms. The terms are used to only distinguish one element from the other element.

Terms used in this application are used to only describe specific exemplary embodiments and are not intended to restrict the present invention. An expression referencing a singular value additionally refers to a corresponding expression of the plural number, unless explicitly limited otherwise by the context.

In this application, terms, such as "comprise", "include", or 'have', are intended to designate those characteristics, numbers, steps, operations, elements, or parts which are described in the specification, or any combination of them that exist, and it should be understood that they do not preclude the possibility of the existence or possible addition of one or more additional characteristics, numbers, steps, operations, elements, or parts, or combinations thereof.

When it is said that one element is described as "transmitting" data to the other element, one element may directly transmit data to the other element or may transmit data to the other element through at least one another element. Contrarily, when it is said that if one element "directly transmits" data to the other element, it should be understood that the data is transmitted to the other element from one element, not through another element.

Hereinafter, the present invention will now be described in detail with reference to the attached drawings wherein the corresponding parts in the embodiments of the present invention are indicated by corresponding reference numerals.

FIG. 1 is a schematic view showing a configuration of a modular robot system according to the present invention.

A modular robot system 10 according to the present invention includes N (N is an integer greater than or equal to 2) cube-type unit robots 100-1 to 100-N. The N cube-type unit robots 100-1 to 100-N are coupled to one another to constitute one modular robot.

The modular robot system 10 further includes a central control terminal 200 for controlling the N cube-type unit robots 100-1 to 100-N.

Only if the central control terminal 200 is a data processing device that performs calculation and data processing or receives input materials to thus perform, store and output the received data, it doesn't matter what kind of data processing device is used. For example, the central control terminal 200 may be a data processing device such as a general computer, a personal computer, a server, a mobile terminal, a remote station, a remote terminal, an access terminal, a terminal, a communication device, a communication terminal, a user agent, a user device or user equipment (UE), a laptop computer, a tablet PC, a smart phone, and a PDA (personal digital assistant).

The central control terminal 200 can perform wireless communication with the N cube-type unit robots 100-1 to 100-N. In specific, the central control terminal 200 can perform wireless communication with the N cube-type unit robots 100-1 to 100-N through various wireless communication methods. For example, the wireless communication methods includes Wi-Fi, magnetic secure transmission (MST), Bluetooth communication, near field communication (NFC), radio frequency identification (RFID), ZigBee, Z-wave, infrared (IR) communication, and so on.

Further, the N cube-type unit robots 100-1 to 100-N can perform the wireless communication with one another through the wireless communication methods as mentioned above. In this case, the central control terminal 200 and the N cube-type unit robots 100-1 to 100-N can use the same wireless communication method as each other.

For the convenience of the description, hereinafter, an example in which the central control terminal 200 and the N cube-type unit robots 100-1 to 100-N wirelessly communicate with each other through Bluetooth will be given, but of course, the technical scope of the present invention is not limited thereto.

On the other hand, the N cube-type unit robots 100-1 to 100-N have the shape of a cube with the same size as each other. The N cube-type unit robots 100-1 to 100-N are all coupled to one another by means of given connectors to constitute one modular robot system.

Now, an explanation of each cube-type unit robot constituting the modular robot system according to the present invention will be in detail given with reference to FIGS. 2 to 4F.

Figure 2:
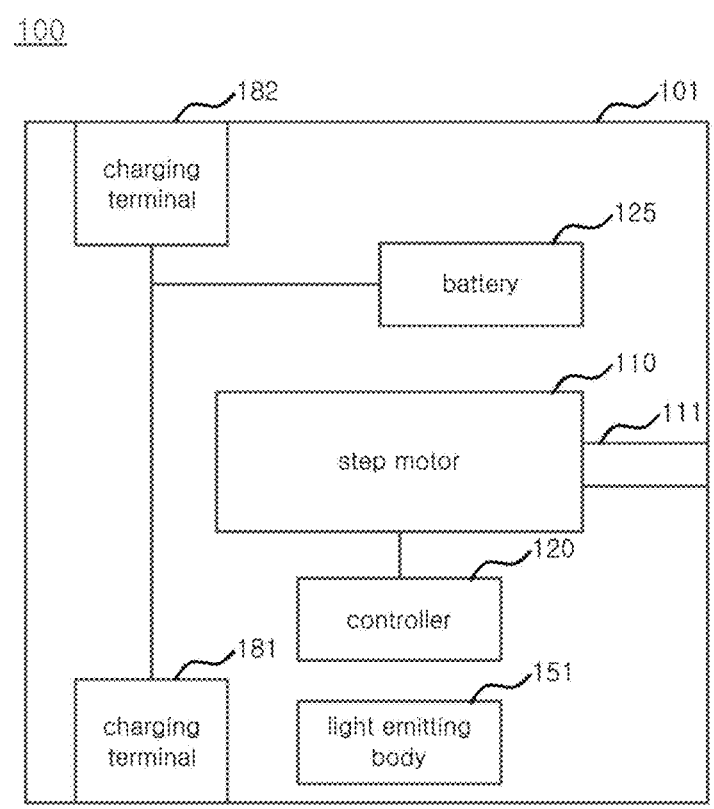
FIG. 2 is a block diagram showing a configuration of a cube-type unit robot constituting the modular robot system according to the present invention.

FIG. 2 is a block diagram showing a configuration of the cube-type unit robot constituting the modular robot system according to the present invention.

As shown in FIG. 2, each cube-type unit robot 100 (hereinafter referred to as 'cube') includes a housing 101 and a step motor 110 and a controller 120 that are located inside the housing 101. According to the present invention, the cube 100 further includes a battery 125, a light emitting body 151, a display module 152, and/or one or more charging terminals 181 and/or 182. According to the present invention, the cube 100 further may include other components in addition to the components as shown in FIG. 2.

The step motor 110, also known as stepper motor or stepping motor, is a brushless DC electric motor that divides a full rotation into a number of equal steps. The step motor 110 rotates a rotary body fitted to a rotary shaft 111.

The step motor 110 includes a two-phase step motor and a higher-phase count step motor. Further, there are three basic types of step motors such as a variable reluctance (VR) type step motor, a permanent magnet (PM) type step motor, and a hybrid type step motor.

According to the present invention, the step motor 110 is configured to have multiple tooth-shaped electromagnets around a metal gear. In this case, these electromagnets are driven by the electric current received from an external control circuit (for example, the controller 120) such as a microcontroller. So as to rotate the rotary shaft 111 of the step motor 110, first, one electromagnet receives power to pull teeth of the gear theretowards. If the teeth of the gear are aligned linearly to the first electromagnet, the gear becomes slowly inclined toward the second electromagnet. If the second electromagnet receives the power, as a result, the first electromagnet is turned off, and the teeth of the gear are aligned linearly to the second electromagnet. Such operations are repeatedly carried out. In this case, each rotation is called 'step', and a number of steps make a full rotation. Accordingly, the step motor 110 can precisely rotate by a given angle.

The controller 120 controls operations and/or resources of various components (for example, the step motor 110, the light emitting body 151, and so on) located in the cube 100.

The controller 120 is a microcontroller or embedded device with a processor and memory. The controller 120 further includes a communication module for performing wireless communication with the central control terminal 200 and/or other cubes.

The processor of the controller 120 includes CPU, GPU, MCU, microprocessor, and so on. The memory of the controller 120 stores various data and computer programs such as the data received/inputted from the outside, the data produced from the controller 120, and so on. The memory includes volatile memory and non-volatile memory. For example, the memory includes a flash memory, ROM, RAM, EEROM, EPROM, EEPROM, solid state disc (SSD), register, and so on. Further, the memory includes a file system, database, and embedded database.

According to the present invention, on the other hand, a protrusion is formed inside the rotary shaft 111 of the step motor 110 so as to allow the controller 120 to recognize an original point of a rotation. Specifically, the controller 120 has a sensor adapted to recognize the protrusion, and a point at which the protrusion is sensed is recognized as the original point.

An explanation of the functions of the controller 120 within the technical scope of the present invention will be in more detail given later.

The battery 125 supplies power to the components (for example, the step motor 110, the controller 120, the light emitting body 151, and the display module 152) of the cube 100. The battery 125 is charged with external power coming into contact with the charging terminals 181 and/or 182.

The light emitting body 151 emits light therefrom. For example, the light emitting body 151 is a light emitting diode. The light emitting body 151 emits various colors of light under the control of the controller 120. Further, the light emitting body 151 emits light consistently or emits flashing light.

According to the present invention, the light emitting body 151 emits light through a light emitting area formed in the housing 101 so that the light emitted can be recognized from the outside.

According to the present invention, the display module 152 displays information on a display area formed on the housing 101 so that the information displayed can be recognized from the outside. For example, the display module 152 is formed of an LED or LED matrix. FIG. 3 is a perspective view showing an outer shape of the cube-type unit robot constituting the modular robot system according to the present invention, and FIGS. 4A to 4F are views showing the surfaces of the cube-type unit robot constituting the modular robot system according to the present invention. FIGS. 4A to 4F show front, back, left side, right side, plan, and bottom surfaces of the cube 100 in the order mentioned.

Referring to FIG. 3, the cube-type unit robot (hereinafter referred to as 'cube') includes the cube-type housing 101. As mentioned above, further, the step motor 110 is located inside the housing 101 (See FIG. 2).

Figure 4A:
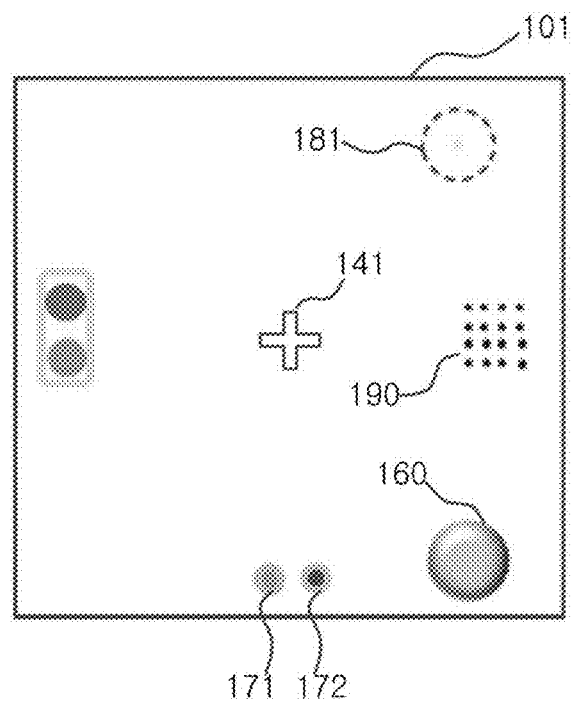
FIGS. 4A, 4B, 4C, 4D, 4E, and 4F are views showing the surfaces of the cube-type unit robot constituting the modular robot system according to the present invention.
Figure 4B:
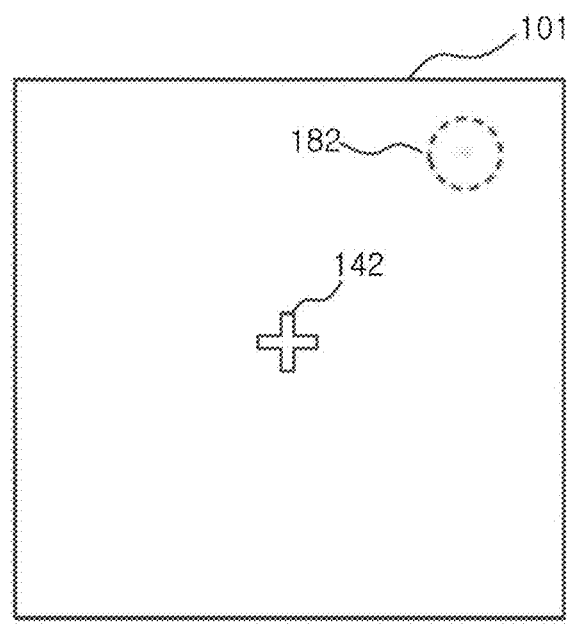
Figure 4C:
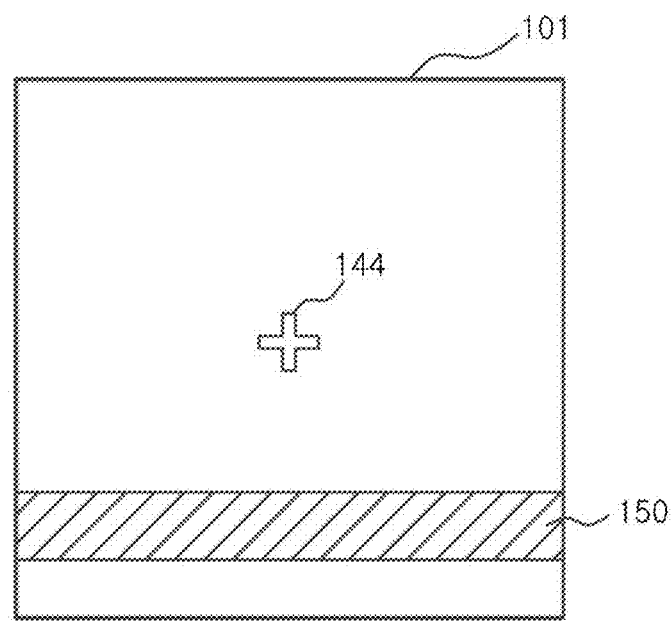
Figure 4D:
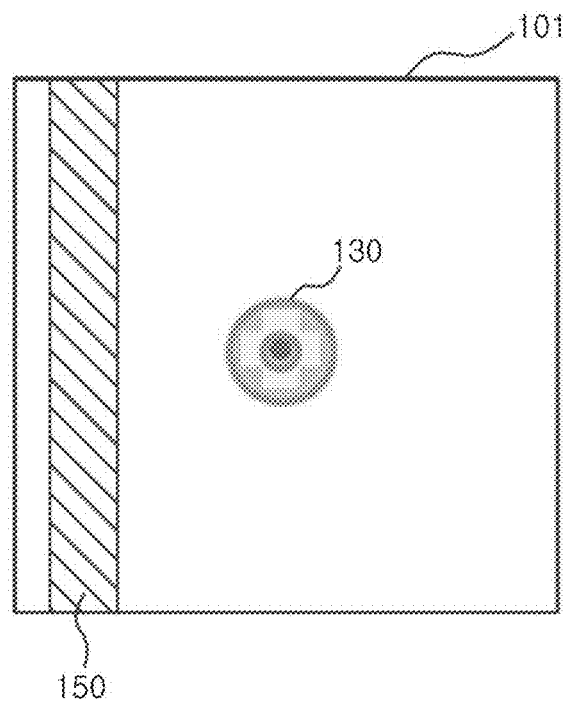
Figure 4E:
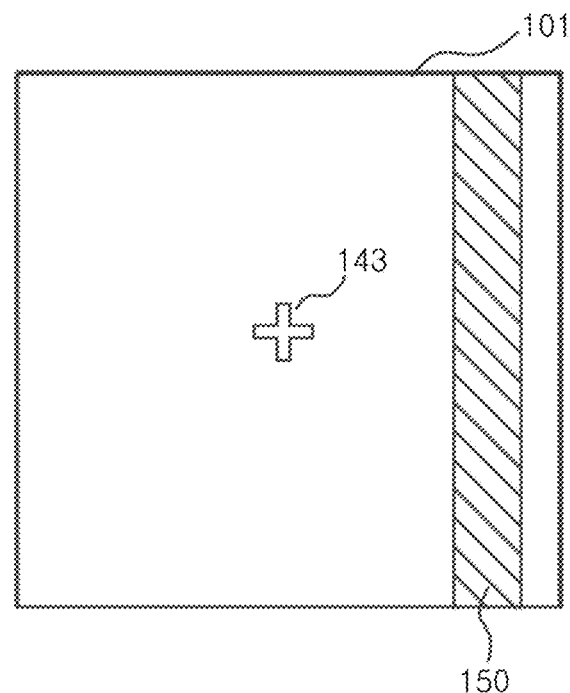

As shown in FIGS. 3 and 4D, the housing 101 has a mounting groove 130 formed on one surface thereof to mount the rotary body rotating by the rotary shaft 111 of the step motor 110 thereon. For example, the rotary body mounted on the mounting groove 130 is a wheel or propeller. The rotary body may have various sizes and shapes, but of course, it has a mounting portion fitted to the mounting groove 130.

As shown in FIGS. 3, 4A to 4C, 4E, and 4F, connection grooves 141 to 145 are formed on the five surfaces of the housing 101. The connection grooves 141 to 145 formed on the five surfaces of the housing 101 have the same shape as one another. For example, the connection grooves 141 to 145 have the same cross shape as one another, but of course, they are not limited thereto.

The connectors are mounted onto the connection grooves 141 to 145. The connectors are parts or accessories connectable to the cube 100.

The connectors may have various sizes and shapes, but of course, they have a mounting portion fitted to any one of the connection grooves 141 to 145. If the connection grooves 141 to 145 are concavely formed to have the shape of a cross, for example, the mounting portions of the connectors are convexly formed to have the same cross shape as the connection grooves 141. On the other hand, some of the connectors may have two or more mounting portions to allow two or more cubes 100 to be connected thereto.

Hereinafter, the rotary body and the connectors are indicated with a term 'accessories'.

According to the present invention, the housing 101 has a light emitting area 150, and the cube 100 further includes a button 160, state display LEDs 171 and 172, and/or a speaker 190.

Figure 4F:
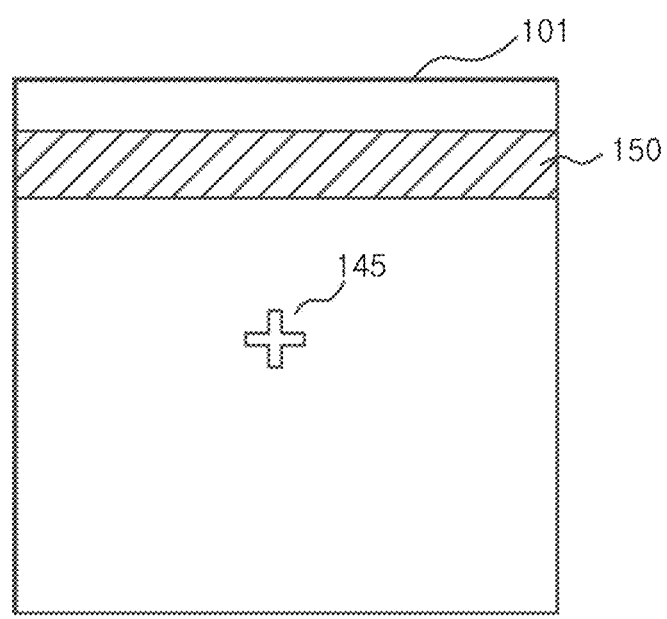

The light emitting area 150 is an area in which the light emitted from the light emitting body 151 is emitted. As shown in FIGS. 3 to 4F, the light emitting area 150 is provided to the shape of a band over the entire surface of the housing 101 except the front and back surfaces thereof, but there are no specific limitations in position, shape, and size. According to the present invention, the light emitting area 150 with various positions and shapes may be formed on the housing 101.

The display area 153 is an area in which the information outputted from the display module 152 is displayed.

The button 160 is used when a user turns on and off the cube 100.

Further, the button 160 is used when a mode of the cube 100 is converted. For example, if the button 160 is pressed over a given time (for example, 3 seconds) in a state where power is turned off, the power is turned on to make the cube 100 in standby mode. If the button 160 is pressed in the standby mode, the state display LEDs 171 and 172 are turned off to convert the standby mode into sleep mode.

The state display LEDs 171 and 172 emit different colors of light therefrom. For example, the state display LED 171 emits blue light, and the state display LED 172 green light.

The state display LEDs 171 and 172 provide various kinds of visual effects indicating the states of the cube 100 under the control of the controller 120. For example, the state display LED 171 flashes before the wireless connection to the central control terminal 200 is finished and emits light continuously after the wireless connection has been finished. The state display LED 172 is turned on, while the battery is being charged, and it is turned off, while the battery is being not charged. If a charged state of the battery is under a given level, the state display LED 172 can flash.

The speaker 190 outputs various kinds of sounds under the control of the controller 120.

As shown in FIGS. 3, 4A, and 4B, the charging terminals 181 and 182 are located on the front and back surfaces of the housing 101. The charging terminal 181 is connected to external power, and in some cases, it comes into contact with the charging terminal of another cube. For example, if the charging terminal 181 of the first cube 100-1 is connected to the external power and the other charging terminal 182 thereof comes into contact with the charging terminal 181 of the second cube 100-2, the second cube 100-2 is charged with the power received through the first cube 100-1. In some cases, three or more cubes are laid sequentially on one another and are thus charged together.

Figure 5:
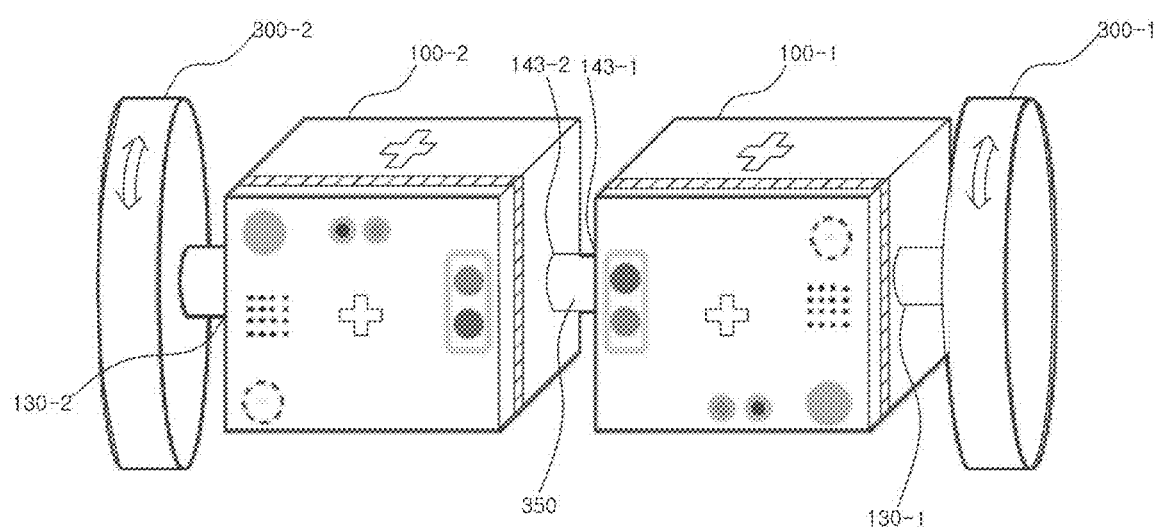
FIG. 5 is a perspective view showing a state where one cube-type unit robot constituting the modular robot system according to the present invention is connected to another cube-type unit robot and accessories.

On the other hand, the N cube-type unit robots 100-1 to 100-N are coupled to one another through the connectors as mentioned above. FIG. 5 is a perspective view showing a state where one cube-type unit robot constituting the modular robot system according to the present invention is connected to another cube-type unit robot and accessories.

Referring to FIG. 5, the wheel-shaped rotary body 300-1 is mounted on the mounting groove 130-1 formed on the right surface of the first cube 100-1. Another wheel-shaped rotary body 300-2 is mounted on the mounting groove 130-2 formed on the right surface of the second cube 100-2. The rotary bodies 300-1 and 300-2 rotate by means of the step motors of the cubes 100-1 and 100-2 coupled thereto.

Further, one connector 350 is mounted on the mounting groove 130-1 formed on the left surface of the first cube 100-1 and on the mounting groove 130-2 formed on the left surface of the second cube 100-2. Through the connector 350, like this, the two cubes 100-1 and 100-2 are coupled to each other.

As shown in FIG. 5, the two cubes 100-1 and 100-2 connected to each other, the rotary bodies 130-1 and 130-2 connected to the cubes, the connector 350 connecting the two cubes 100-1 and 100-2, and the central control terminal 200 controlling the two cubes 100-1 and 100-2 constitute one modular robot system finished.

FIG. 5 just shows the modular robot system with a very simple configuration for the brevity of the description, but of course, three or more cubes and the accessories with various shapes may constitute the modular robot system. As the unit cubes are coupled with one another through different coupling ways or the shapes of accessories are changed, the modular robot system may have drastically different shapes. According to the present invention, that is, the unit cubes with the simple configuration are coupled to one another through various coupling ways to provide the modular robot system with various shapes.

As mentioned above, the central control terminal 200 is wirelessly connected to the cubes 100 and controls the cubes 100. Hereinafter, an explanation of a process of wirelessly connecting the central control terminal 200 to the cubes 100 will be given with reference to FIGS. 6A and 6B.

Figure 6A:
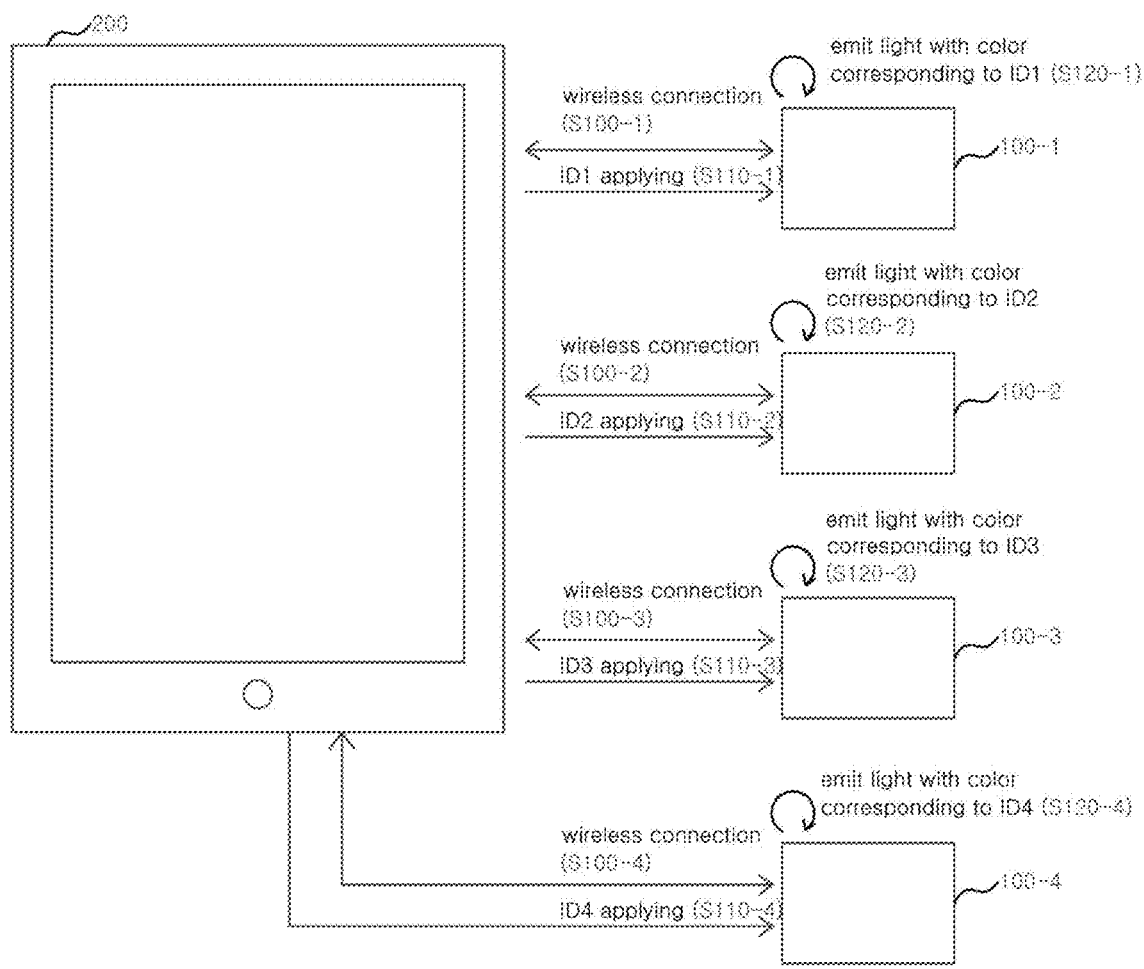
FIG. 6A is a view showing a process where the plurality of cube-type unit robots are connected to a central control terminal.

FIG. 6A shows a process where the central control terminal 200 is connected to the cubes 100. Specifically, FIG. 6A shows an example in which four cubes are connected to the central control terminal 200.

Referring to FIG. 6A, the central control terminal 200 is connected wirelessly to the first cube 100-1 through the given wireless communication method (for example, Bluetooth) (Step S100-1).

After that, the central control terminal 200 applies an identification number 1 to the cube (that is, the first cube 100-1) initially connected thereto (step S110-1), and the first cube 100-1 to which the identification number 1 is applied emits light with a color corresponding to the identification number 1 (Step S120-1).

Now, the details are as below. Unique colors are designated to identification numbers. For example, red color is in advance defined to the identification number 1, blue to the identification number 2, green to the identification number 3, and yellow to the identification number 4. The controllers 120 of the respective cubes in advance store the information corresponding to the colors, and in FIG. 6B, it is assumed that the colors corresponding to the identification numbers have been in advance defined.

The controller 120-1 of the first cube 100-1 receives the identification number 1 from the central control terminal 200 and controls the light emitting body 151-1 to allow the light with the color corresponding to the identification number 1 ID1 to be emitted through the light emitting area 150-1. For example, the controller 120-1 of the first cube 100-1 allows light with the red color corresponding to the identification number 1 to be emitted from the light emitting body 151-1.

Furthermore, the central control terminal 200 is connected wirelessly to the second cube 100-2 through the given wireless communication method (for example, Bluetooth) (Step S100-2).

After that, the central control terminal 200 applies the identification number 2 to the cube (that is, the second cube 100-2) secondly connected thereto (Step S110-2), and the second cube 100-2 to which the identification number 2 is applied emits light with a color corresponding to the identification number 2 (Step S120-2). For example, the second cube 100-2 emits light with the blue color corresponding to the identification number 2.

Further, the central control terminal 200 is connected wirelessly to the third cube 100-3 through the given wireless communication method (for example, Bluetooth) (Step S100-3).

After that, the central control terminal 200 applies the identification number 3 to the cube (that is, the third cube 100-3) thirdly connected thereto (Step S110-3), and the third cube 100-3 to which the identification number 3 is applied emits light with a color corresponding to the identification number 3 (Step S120-3). For example, the third cube 100-3 emits light with the green color corresponding to the identification number 3.

Also, the central control terminal 200 is connected wirelessly to the fourth cube 100-4 through the given wireless communication method (for example, Bluetooth) (Step S100-4).

After that, the central control terminal 200 applies the identification number 4 to the cube (that is, the fourth cube 100-4) fourthly connected thereto (Step S110-4), and the fourth cube 100-4 to which the identification number 4 is applied emits light with a color corresponding to the identification number 4 (Step S120-4). For example, the fourth cube 100-4 emits light with the yellow color corresponding to the identification number 4.

According to the present invention, the respective cubes constituting one modular robot emit light with different colors corresponding to the identification numbers designated thereto, so that the cubes with the same shape as one another can be easily distinguished from one another by means of a user.

In addition to emitting the light with the unique colors, on the other hand, the respective cubes may output information corresponding to the identification numbers designated thereto.

According to the present invention, the respective cubes can display the identification numbers applied from the central control terminal 200 or display the information corresponding to the identification numbers. To do this, the controller 120 of each cube 100 controls the display module 152 so that the received identification number or the information corresponding thereto is outputted through the display area 153.

According to the present invention, otherwise, the respective cubes can output the sound corresponding to the received identification numbers through their speakers 190. To do this, the controller 120 of each cube 100 controls the speaker 190 so that the sound corresponding to the received identification number is outputted through the speaker 190. For example, the cube to which the identification number 1 is applied outputs a sound 'do', the cube to which the identification number 2 is applied outputs a sound 're', the cube to which the identification number 3 is applied outputs a sound 'mi', and the cube to which the identification number 4 is applied outputs a sound 'fa'.

FIG. 6B is a flowchart showing the process where the plurality of cube-type unit robots 100 are connected to the central control terminal 200, which is performed from the point of view of the central control terminal 200.

Referring to FIG. 6B, any one group i of groups 1 to N is selected through the central control terminal 200 (Step S200). The group i (i=an integer of 1<=i<=N) means a group of modular robots made with i cubes. Further, at least one model is provided in the group i, and the model means one modular robot finished that can be made with i cubes.

Figure 7A:
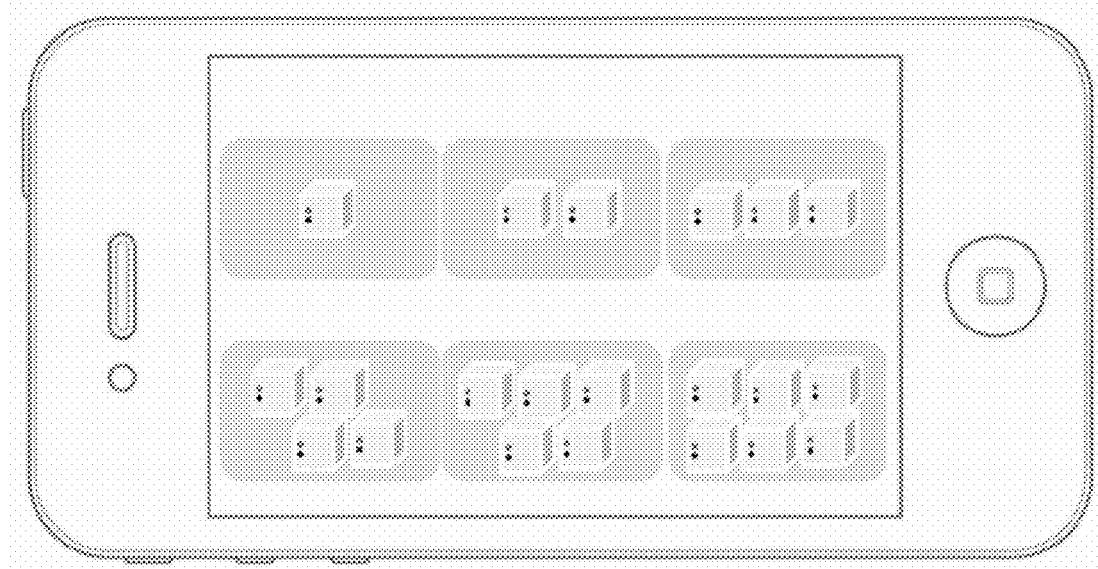
FIG. 7A is a view showing an example of a group selection user interface (UI).

According to the present invention, the groups can be selected through group selection UI (User Interface) outputted from the central control terminal 200. FIG. 7A is a view showing an example of the group selection UI. In FIG. 7A, the group selection UI includes icons corresponding to the groups 1 to N, and the user designates one of the icons to select the group corresponding to the designated icon.

Figure 7B:
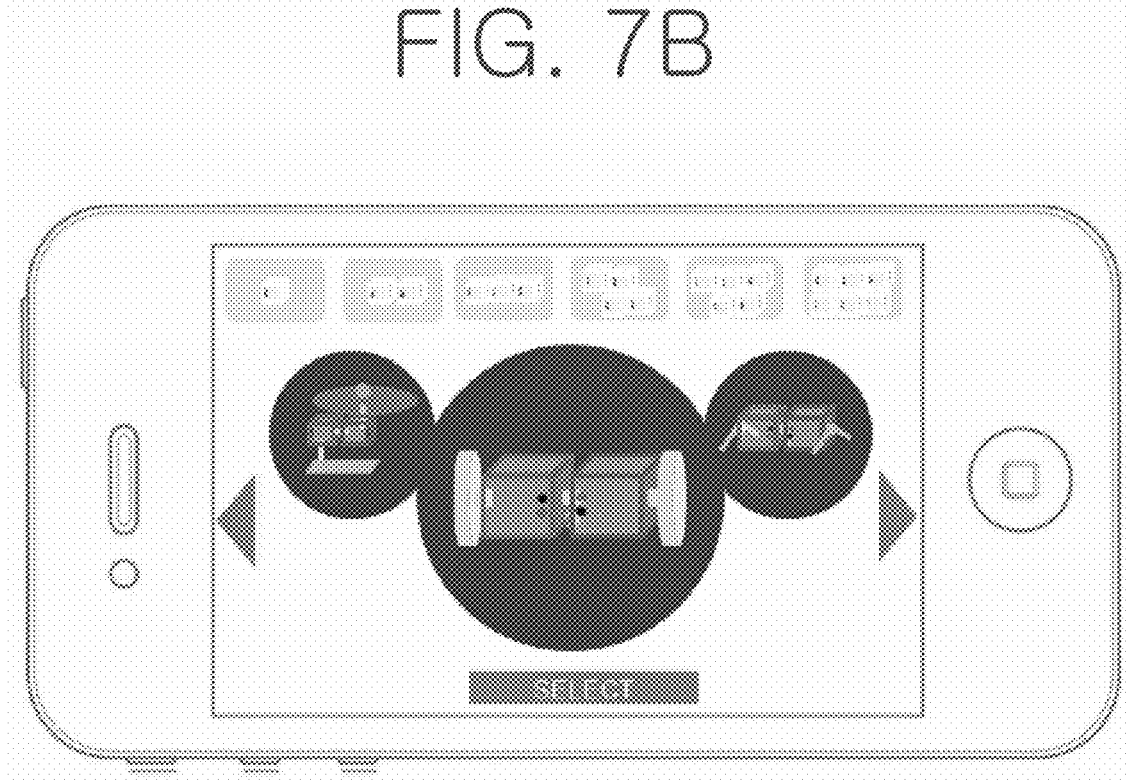
FIG. 7B is a view showing an example of a model selection UI.

Referring back to FIG. 6B, one of the models provided in the group selected through the central control terminal 200 is selected (Step S210). According to the present invention, the model can be selected through model selection UI outputted from the central control terminal 200. FIG. 7B is a view showing an example of the model selection UI. FIG. 7B shows an example in which the group 2 is selected at the previous step. Through the model selection UI of FIG. 7B, the user selects a desired model.

Referring back to FIG. 6B, the central control terminal 200 determines whether the number of cubes connected at present is i (Step S220) or not, and if not, the central control terminal 200 stands by the wireless connection with new cubes (Step S230).

If the central control terminal 200 is wirelessly connected to the new cubes, it applies a new identification number to the new cubes wirelessly connected thereto (Steps S240 and S250).

The cubes wirelessly connected to the central control terminal 200, to which the identification number is applied, emits the light with the color corresponding to the identification number applied thereto through the light emitting area, and the details are already explained with reference to FIG. 6A.

As the processes are repeatedly carried out, the central control terminal 200 can be wirelessly connected to i cubes.

If the central control terminal 200 can be wirelessly connected to the i cubes, one of at least one activities performed by means of the modular robot corresponding to the model selected at the step S210 is selected (Step S260), and a given control process in which the selected activity is performed by means of the modular robot is carried out (Step S270).

Figure 7C:
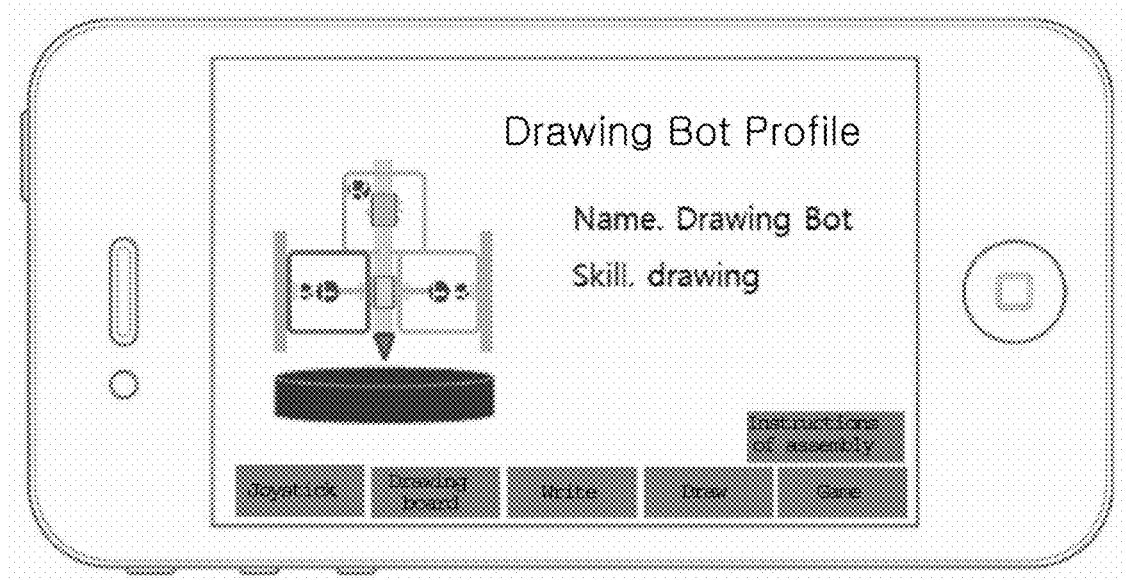
FIG. 7C is a view showing an example of an activity selection UI.

According to the present invention, the user selects the model through activity selection UI outputted from the central control terminal 200. FIG. 7C is a view showing an example of the activity selection UI. FIG. 7C shows an example in which a model named "AutoCar" is selected. In the example of FIG. 7C, the modular robot corresponding to the model "AutoCar" includes a control activity through joystick, a drawing activity of drawing the same track shape as the user's drawing, and a dance mode activity of moving a in advance defined track. The user can select one of at least one or more activities designated to the model.

Data that defines the respective activities can be provided as the forms of lookup tables corresponding to the activities. In this case, each lookup table includes descriptors of step motor control sequences corresponding to the respective cubes constituting the modular robot performing the activities.

The step motor control sequences are lists of the step motor control operations performed by each cube 100 (more accurately, the controller 120 of the cube 100). For example, the step motor control sequences are lists of the number of pulses per unit time. The descriptors of step motor control sequences are storable data for defining the step motor control sequences.

As mentioned above, on the other hand, the identification numbers are in advance applied to the respective cubes, and the step motor control sequences can correspond to the identification numbers applied to the respective cubes.

FIG. 8 is a view showing an example of a lookup table including descriptors of step motor control sequences defining one activity. In FIG. 8, a lookup table 1000 defines a specific activity performed by the modular robot with four cubes.

As shown in FIG. 8, the lookup table 1000 includes the descriptors of four step motor control sequences 1000-1 to 1000-4 performing one activity.

The first cube 100-1 with the identification number 1 performs the first step motor control sequence 1000-1, the second cube 100-2 with the identification number 2 the second step motor control sequence 1000-2, the third cube 100-3 with the identification number 3 the third step motor control sequence 1000-3, and the fourth cube 100-4 with the identification number 4 the fourth step motor control sequence 1000-4.

In the example of FIG. 8, the first cube 100-1 rotates the step motor by 30 pulses every unit time. Contrarily, the third cube 100-3 reversely rotates the step motor by 30 pulses every unit time. The second cube 100-2 repeats rotation by 60 pulses, reverse rotation by 30 pulses, and rotation by 90 pulses. The fourth cube 100-4 repeats rotation by 60 pulses, rotation by 90 pulses, and rotation by 120 pulses.

The step motor control sequences of FIG. 8 are just examples, and of course, they may have various values finely adjusted according to activities. Further, the forms of the step motor control sequences may be freely provided only if the rotating operations of the step motors of the cubes are defined individually. For example, the step motor control sequences may become lists with values of driving time and pulses. In this case, one value may indicate a rotation pulse of the step motor for a specific driving time.

According to the present invention, various motions can be provided through the adjustment of only the step motor control sequences performed by the cubes.

According to the present invention, further, the step motor control sequences include lists of rotating angles of the step motors with respect to the original points of the step motors. For example, the step motor control sequences have the forms of [30, 60, 30, −30], which means that the step motor rotates for initial unit time to move to a position of 30° from the original point, rotates for next unit time to move to a position of 60° from the original point, reversely rotates for another next unit time to move to a position of 30° from the original point, and reversely rotates for another next unit time to move to a position of −30° from the original point.

According to the present invention, on the other hand, the lookup table including the descriptors of the step motor control sequences is stored in the central control terminal 200. In this case, the central control terminal 200 in advance transmits the step motor control sequences performed by the cubes to the cubes, individually, before the activity is performed.

According to the present invention, further, the lookup table may be in advance stored in each cube (accurately, the controller 120 of the cube). In this case, each cube extracts the step motor control sequence to be performed from the lookup table and thus performs the step motor control sequence.

According to the present invention, the respective cubes store all lookup tables corresponding to all of the activities performed thereby, and if the group/model/activity are selected, the cubes extract the step motor control sequences to be performed from the lookup table corresponding to the selected group/model/activity and thus perform the step motor control sequences.

So as to allow one modular robot system with N cubes to perform a given activity in a proper way, on the other hand, it is necessary for the N cubes to perform the step motor control sequences on exact time. Accordingly, there is a need for a process where the N cubes are synchronized with one another and a process where the synchronized N cubes control their step motors. Hereinafter, an explanation on these processes will be in detail given with reference to FIG. 9.

Figure 9:
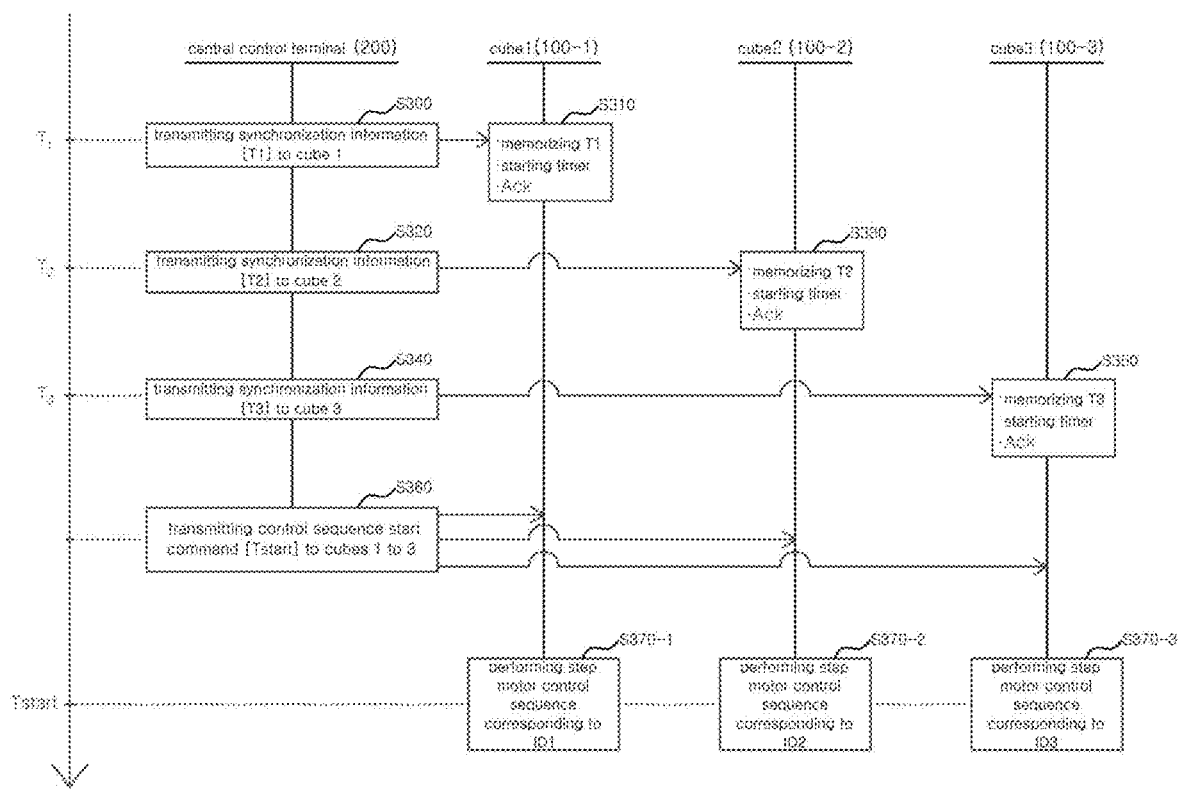
FIG. 9 is a flowchart showing synchronization processes among the cube-type unit robots and the central control terminal.

FIG. 9 is a flowchart showing synchronization and activity executing processes among the cube-type unit robots and the central control terminal. In FIG. 9, steps are indicated on the time line with respect to the timer operating in the central control terminal 200. FIG. 9 shows the modular robot with three cubes.

Referring to FIG. 9, the central control terminal 200 transmits synchronization information to the cubes, and in this case, the synchronization information of each cube includes a synchronization information transmission time point measured with respect to the timer operating in the central control terminal 200.

In specific, the central control terminal 200 transmits synchronization information to the first cube 100-1 at a time point of $T_1$ (Step S300). The synchronization information includes information on the time point of $T_1$.

The first cube 100-1 which receives the synchronization information stores the time point of $T_1$ of the synchronization information, and after starting its own timer, it transmits an acknowledgement signal Ack to the central control terminal 200 (Step S310).

Further, the central control terminal 200 transmits synchronization information to the second cube 100-2 at a time point of $T_2$ (Step S320). The synchronization information includes the information on the time point of $T_2$.

The second cube 100-2 which receives the synchronization information stores the time point of $T_2$ of the synchronization information, and after starting its own timer, it transmits an acknowledgement signal Ack to the central control terminal 200 (Step S330).

Furthermore, the central control terminal 200 transmits synchronization information to the third cube 100-3 at a time point of $T_3$ (Step S340). The synchronization information includes the information on the time point of $T_3$.

The third cube 100-3 which receives the synchronization information stores the time point of $T_3$ of the synchronization information, and after starting its own timer, it transmits an acknowledgement signal Ack to the central control terminal 200 (Step S350).

After receiving the last acknowledgement signal Ack, the central control terminal 200 transmits a control sequence start command to the first to third cubes 100-1 to 100-3. In this case, the control sequence start command includes start time point $T_{start}$ information calculated with respect to the timer operating in the central control terminal 200.

The central control terminal 200 determines as the start time point $T_{start}$ the time point after a given time from the time point at which the last acknowledgement signal Ack is received, and in this case, the determination is made in full consideration of the time during which signal/data are transmitted to the cubes through wireless communication. The central control terminal 200 can determine the start time point $T_{start}$ with sufficient spare time to allow the start time point $T_{start}$ to come after the control sequence start command has been transmitted to the cubes.

On the other hand, the cubes are synchronized with one another with respect to the timer of the central control terminal 200, so that they can recognize whether the start time point $T_{start}$ contained in the control sequence start command comes or not through their own timer and the transmission time points of the synchronization information received thereto. Accordingly, the cubes at the start time point $T_{start}$ start to perform the step motor control sequences corresponding to their identification numbers in advance applied thereto (Steps S370-1, S370-2, and S370-3).

On the other hand, the user directly builds the step motor control sequences to be performed by the respective cubes to develop a new activity or corrects the existing step motor control sequences to operate in a customized manner the modular robot in his or her desired way. To do this, the central control terminal 200 can provide a UI through which the user can build/correct the step motor control sequences.

According to the present invention, on the other hand, since the cube-type unit robots have the shape of a regular hexahedron, they may be coupled to one another to wrong shapes. So as to overcome such problem, accordingly, another example of the cube-type unit robot according to the present invention will be explained with reference to FIGS. 10 to 11F.

Figure 10:
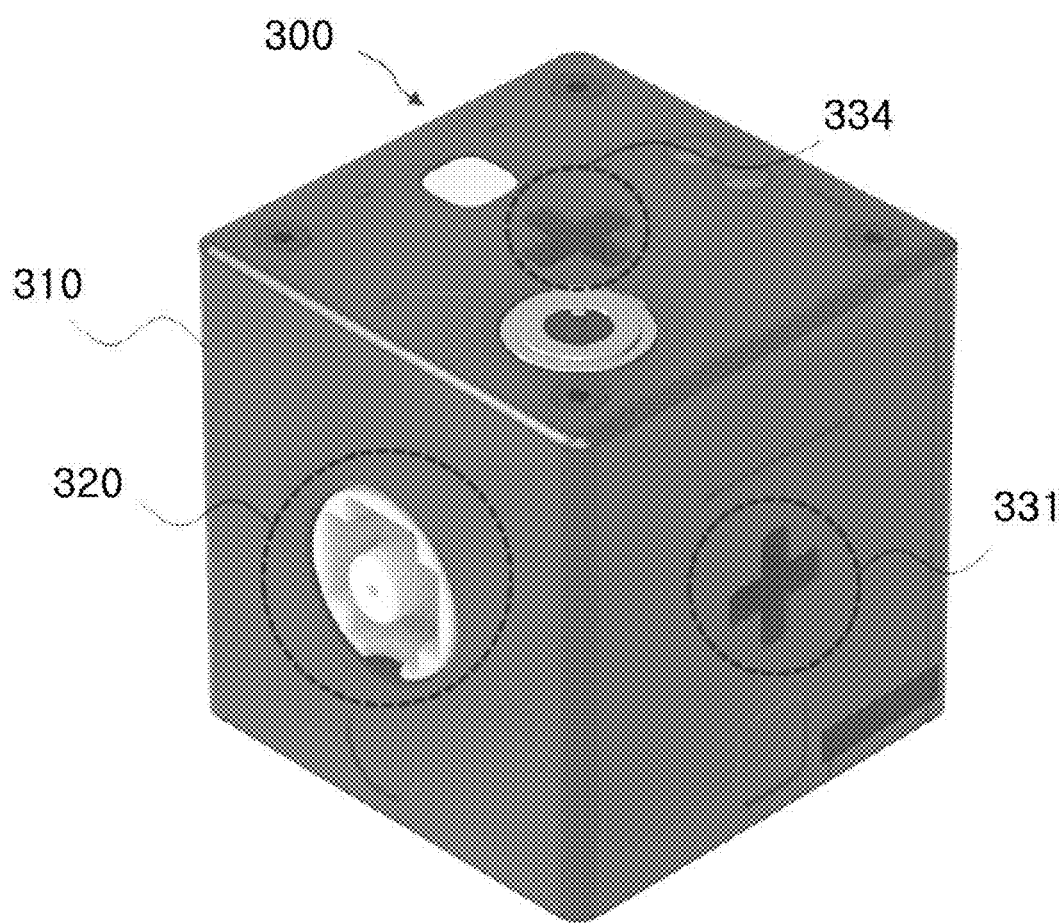
FIG. 10 is a perspective view showing an outer shape of another example of the cube-type unit robot constituting the modular robot system according to the present invention.

FIG. 10 is a perspective view showing an outer shape of another example of the cube-type unit robot constituting the modular robot system according to the present invention, and FIGS. 11A to 11F are views showing the surfaces of the cube-type unit robot of FIG. 10.

Referring to FIG. 10, the cube-type unit robot according to the present invention includes a housing 300 having a shape of a regular hexahedron, and a step motor is located inside the housing 300.

Figure 11A:
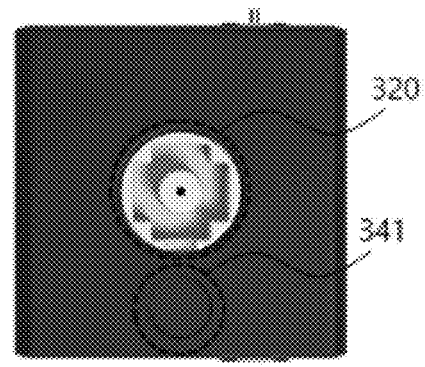
FIGS. 11A, 11B, 11C, 11D, 11E, and 11F are views showing the surfaces of the cube-type unit robot of FIG. 10.
Figure 11B:
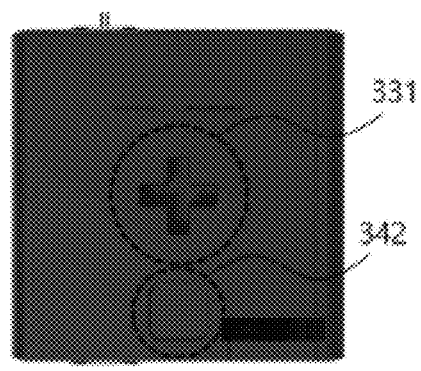
Figure 11C:
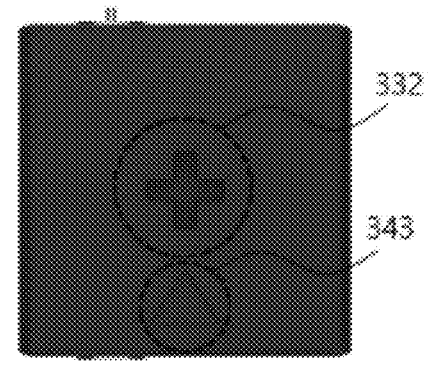
Figure 11D:
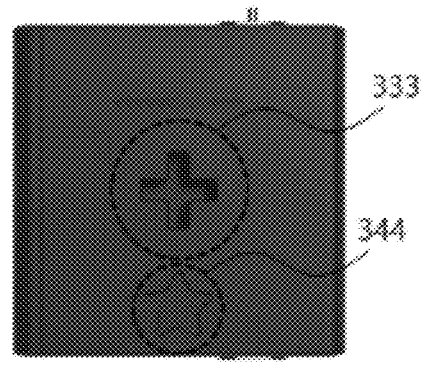
Figure 11E:
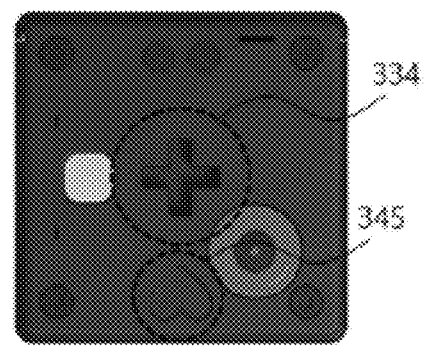

As shown in FIGS. 10 and 11A, the housing 300 has a mounting groove 320 formed on one surface thereof to mount a rotary body rotating by a rotary shaft of the step motor thereon. As shown in FIGS. 10 and 11B to 11F, further, connection grooves 331 to 335 are formed on the five surfaces of the housing 300.

Further, identification marks varying in shapes are formed on the five surfaces of the housing 300 in such a manner as to be distinguished from one another. According to the present invention, as shown in FIGS. 11A to 11E, a ○-shaped mark 341 is formed on the front surface of the housing 300 (See FIG. 11A), a □-shaped mark 342 on the left surface of the housing 300 (See FIG. 11B), a ∆-shaped mark 343 on the rear surface of the housing 300 (See FIG. 11C), a ☆-shaped mark 344 on the right surface of the housing 300 (See FIG. 11D), and a ♡-shaped mark 345 on the plan (top) surface of the housing 300 (See FIG. 11E).

Referring to FIGS. 11A to 11F, further, no separate mark is formed on the underside of the housing 300, and of course, an identification mark distinguishable from other marks may be formed on the underside of the housing 300. In specific, the identification marks with the different shapes distinguishable from one another may be formed on every surface of the housing 300.

Figure 11F:
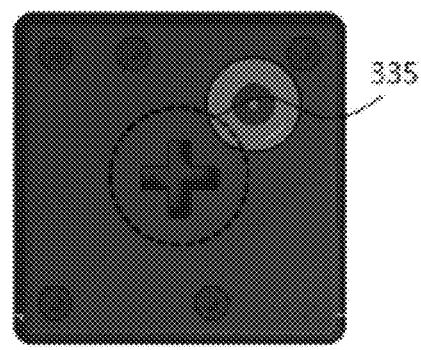

According to the present invention, as shown in FIGS. 10 to 11F, the respective surfaces of the unit robot having the shape of the regular hexahedron can be easily distinguished from one another by the user, thereby providing many conveniences in coupling the respective unit robots to right shapes.

On the other hand, most of the technical scope of the present invention as explained with reference to FIGS. 1 to 9 is applied to the cube-type unit robot as shown in FIGS. 10 to 11F, excepting the difference in their outer shape, which can be easily understood by a person having ordinary skill in the art.

The disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. For example, the parts expressed in a singular form may be dispersedly provided, and in the same manner as above, the parts dispersed may be combined with each other.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention. The present invention is applicable to a modular robot system having improved conveniences in assembly.

The invention claimed is:

1. A modular robot system having N (N is an integer greater than or equal to 2) cube-type unit robots, each of the N cube-type unit robots comprising:
    a housing in the shape of a regular hexahedron;
    a step motor located in the housing; and
    a controller located in the housing to control the step motor,
    wherein the housing includes:
        a pair of mounting grooves each formed on opposing surfaces thereof to mount a rotary body rotating by a rotary shaft of the step motor thereon;
        connection grooves with the same shape as each other formed on five surfaces thereof, so that the cube-type unit robot is connectable to another cube-type unit robot through connectors mounted on the connection grooves;
        identification marks with different shapes from one another on the respective surfaces thereof; and
    a central control terminal for applying the different identification numbers to the N cube-type unit robots, the controller performing a step motor control sequence corresponding to the identification number received among N step motor control sequences (which correspond to N identification numbers transmitted to the N cube-type unit robots) in advance defined,
    wherein the controller stores a lookup table with descriptors of the N step motor control sequences in advance defined, extracts the descriptor of the step motor control sequence corresponding to the identification number received from the lookup table stored, and performs the step motor control sequence on the basis of the descriptor of the step motor control sequence extracted.

2. The modular robot system according to claim 1, wherein the controller receives any one of different identification numbers designated to the N cube-type unit robots and performs a step motor control sequence corresponding to the identification number received among N step motor control sequences (which correspond to N identification numbers transmitted to the N cube-type unit robots) in advance defined.

3. The modular robot system according to claim 2, wherein each cube-type unit robot further comprises a light emitting body for emitting light through a light emitting area formed on the housing, and the controller controls the light emitting body to allow the light with a color corresponding to the identification number transmitted thereto to be emitted through the light emitting area.

4. The modular robot system according to claim 2, wherein each cube-type unit robot further comprises a display module for displaying information through a display area formed on the housing, and the controller controls the display module to allow the information corresponding to the identification number transmitted thereto to be outputted through the display area.

5. The modular robot system according to claim 2, wherein each cube-type unit robot further comprises a speaker disposed on the housing, and the controller controls the speaker to allow the sound corresponding to the identification number transmitted thereto to be outputted through the speaker.

6. The modular robot system according to claim 1, wherein the descriptors of the N step motor control sequences comprises a list of a number of pulses per unit time.

7. The modular robot system according to claim 1, wherein the central control terminal transmits the descriptors of the step motor control sequences corresponding to the identification numbers of the N cube-type unit robots to the N cube-type unit robots, and the controller performs the step motor control sequence on the basis of the descriptor of the step motor control sequence transmitted to the cube-type unit robot.

8. The modular robot system according to claim 1, wherein the central control terminal transmits synchronization information to the N cube-type unit robots, the synchronization information comprising synchronization information transmission time point measured based on a timer operating in the central control terminal, and transmits control sequence start commands to the N cube-type unit robots, the control sequence start commands comprising start time point information calculated based on the timer operating in the central control terminal, and the controller starts an own timer thereof if the synchronization information is transmitted to the cube-type unit robot and if the control sequence start command is transmitted to the cube-type unit robot, performs the step motor control sequence at the start time point using the synchronization information transmission time point of the synchronization information and the own timer thereof.

9. The modular robot system according to claim 1, wherein any one of the N cube-type unit robots serves as a central control terminal, and the cube-type unit robot serving as the central control terminal applies different identification numbers to the N cube-type unit robots, the controller performing a step motor control sequence corresponding to the identification number of the cube-type unit robot among N step motor control sequences (which correspond to N identification numbers transmitted to the N cube-type unit robots) in advance defined.

10. The modular robot system according to claim 9, wherein the N cube-type unit robots further comprise reader devices for recognizing information stored in a given recording medium, and if the recording medium is recognized by means of any one of the reader devices of the N cube-type unit robots, the cube-type unit robot with the corresponding reader device serves as the central control terminal.

11. A modular robot system having N (N is an integer greater than or equal to 2) cube-type unit robots, each of the N cube-type unit robots comprising:
a housing in the shape of a regular hexahedron;
a step motor installed in the housing; and
a controller installed in the housing to control the step motor,
wherein the housing includes:
 a pair of mounting grooves each formed on opposing surfaces thereof to mount a rotary body rotating by a rotary shaft of the step motor thereon;
 connection grooves with the same shape as each other formed on five surfaces thereof, so that the cube-type unit robot is connectable to another cube-type unit robot through connectors mounted on the connection grooves;
 identification marks with different shapes from one another on all surfaces except any one surface of the six surfaces thereof; and a central control terminal for applying the different identification numbers to the N cube-type unit robots, the controller performing a step motor control sequence corresponding to the identification number received among N step motor control sequences (which correspond to N identification numbers transmitted to the N cube-type unit robots) in advance defined,
wherein the central control terminal transmits the descriptors of the step motor control sequences corresponding to the identification numbers of the N cube-type unit robots to the N cube-type unit robots, and the controller performs the step motor control sequence on the basis of the descriptor of the step motor control sequence transmitted to the cube-type unit robot.

12. The modular robot system according to claim 11, wherein the controller receives any one of different identification numbers designated to the N cube-type unit robots and performs a step motor control sequence corresponding to the identification number received among N step motor control sequences (which correspond to N identification numbers transmitted to the N cube-type unit robots) in advance defined.

13. The modular robot system according to claim 11, further comprising a central control terminal for applying the different identification numbers to the N cube-type unit robots, the controller performing a step motor control sequence corresponding to the identification number received among N step motor control sequences (which correspond to N identification numbers transmitted to the N cube-type unit robots) in advance defined.

14. The modular robot system according to claim 11, wherein any one of the N cube-type unit robots serves as a central control terminal, and the cube-type unit robot serving as the central control terminal applies different identification numbers to the N cube-type unit robots, the controller performing a step motor control sequence corresponding to the identification number of the cube-type unit robot among N step motor control sequences (which correspond to N identification numbers transmitted to the N cube-type unit robots) in advance defined.

* * * * *